May 10, 1966  R. G. SEYL  3,250,689
SIMPLIFIED METHOD OF MEASURING CORROSION
USING REFERENCE ELECTRODE
Original Filed Dec. 14, 1962
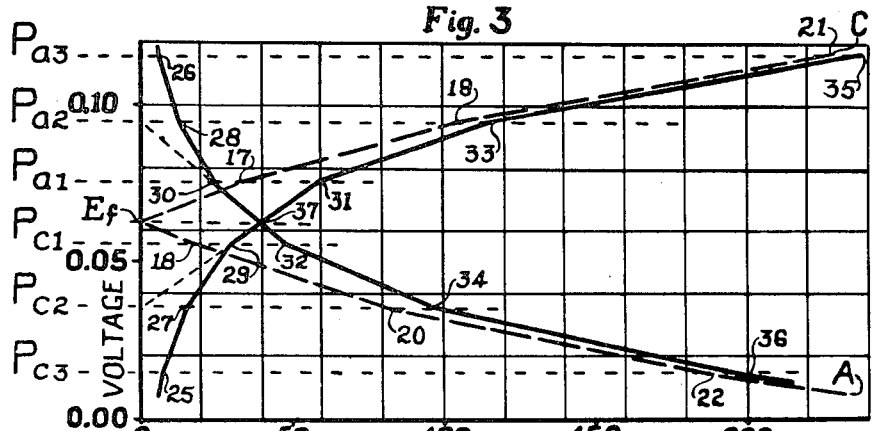
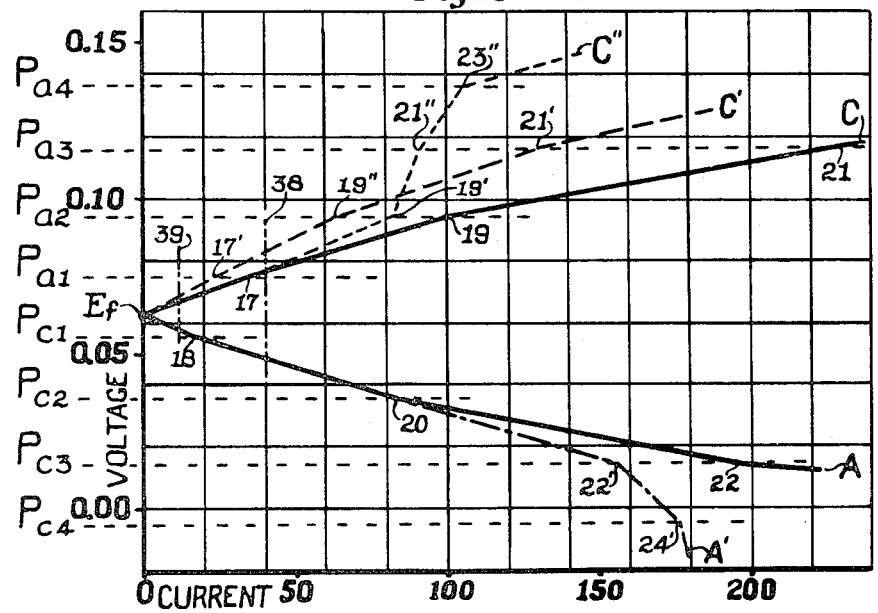
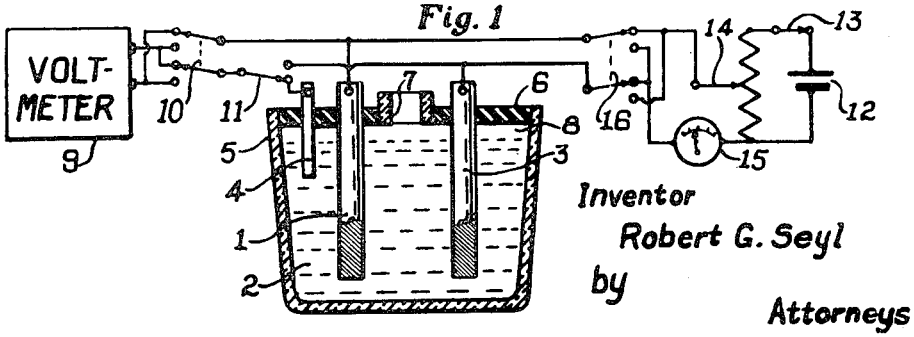
Inventor
Robert G. Seyl
by
Attorneys

United States Patent Office 3,250,689
Patented May 10, 1966

3,250,689
SIMPLIFIED METHOD OF MEASURING CORROSION USING REFERENCE ELECTRODE
Robert G. Seyl, 1123 Mulford St., Evanston, Ill.
Continuation of application Ser. No. 244,693, Dec. 14, 1962. This application May 3, 1965, Ser. No. 452,941
26 Claims. (Cl. 204—1)

This invention is directed to simplifications in the measurement of the corrosion current determining the corrosion rate of an electronic conductor corroded by a non-gaseous ionic conductor, and is a continuation of my co-pending application S.N. 244,693, filed December 14, 1962, now abandoned, which is a continuation-in-part of my co-pending application Serial No. 840,239, filed October 22, 1959, now U.S. Patent No. 3,069,332, which is in turn a continuation-in-part of my co-pending application Serial No. 778,211, filed December 4, 1958, now abandoned, which is in turn a continuation-in-part of my co-pending application Serial No. 659,459, filed May 15, 1957, now abandoned, which is in turn a continuation-in-part of my application Serial No. 282,935, filed April 18, 1952, now abandoned, which is in turn a continuation-in-part of my application Serial No. 786,499, filed November 17, 1947, and now abandoned.

The present application deals with a simplification of a method described and claimed in my co-pending application Serial No. 840,266, filed on September 16, 1959, now U.S. Patent No. 3,156,631, which method, of that application, is hereinafter referred to as the preceding division of this invention.

DEFINITIONS

Some terminology used in the art requires more specific definition when applied to this invention, and these definitions follow.

An electronic conductor conducts D.C. current by electron flow. Elemental metals and their alloys typify electronic conductors, but the class includes substances which do not have metallic properties, as carbon and graphite, and certain chemical compounds as oxides and sulfides.

A non-gaseous ionic conductor consists of an electrolyte dissolved in an ionizing solvent, and conducts D.C. current by the flow of positive ions in one direction and the flow of negative ions in the opposite direction. The "ionic conductor" hereinafter referred to excludes the gaseous type of ionic conductor also known to the art.

A corrosion interface is here defined as that boundary region between the surface of an electronic conductor and an ionic conductor in contact therewith, within which occur the electrochemical corrosion reactions of ion formation and discharge produced by electric current, and within which these corrosion reactions may be affected by films formed on the electronic conductor surface by physical absorption, electrochemical migration, chemical combination, mechanical application, and other means.

The voltage existing across the interface bounding electronic and non-gaseous ionic conduction is not directly measurable. It is indirectly measured as the voltage difference between said electronic conductor and the electronic conductor of a reference electrode in electrical contact with the ionic conductor, and is termed the electrode potential, with the nature of the reference electrode also identified.

Free electrode potential is here defined as the electrode potential existing when the interface bounding electronic and non-gaseous ionic conduction is free from voltage disturbances produced by or momentarily resulting from externally produced current passed through the interface.

When a D.C. current is passed through the interface bounding electronic and non-gaseous ionic conduction, the voltage across the interface becomes altered in value and a polarized electrode potential results. Polarization voltage is here defined as the difference between the polarized electrode potential and the free electrode potential.

New terminologies essential to describing novel details of this invention are set out through the use of word capitalizations in the specification and claims which follow.

OBJECTS

The principal object of this invention is the provision of a simplified method for measuring the corrosion rate of an electronic conductor surface corroded by a non-gaseous ionic conductor.

Another object of this invention is the provision of a method of the foregoing character which simplifies measurement of the corresion current of an electrochemical mechanism measured and described in detail in the preceding division of this invention.

Another object of this invention is a method of the foregoing character which measures with practically instantaneous speed the corrosion current that determines the corrosion rate.

A further object of this invention is a method of the foregoing character which continuously measures this corrosion current.

THE ART

This invention is directed to a simplified method for measuring the corrosion current of the interface electrode system.

In the preceding division of this invention, greatest simplification in measurement of the corrosion current operating within a corrosion interface corroding at the free electrode potential requires measurement by the method of the invention of a range of current-potential relationship substantially including the free electrode potential of the corrosion interface and extending beyond the transition point occurring at minimum polarization voltage, and application of resolving operations to this measured range of current-potential relationship through previously measured characteristic values of the voltage separation between consecutive transition points and of the line slope voltage, to produce measurement of the component current-potential relationship of the interface electrode system.

In the method described herein, the requirement for measuring initial range of current-potential relationship is simplified to the requirement for a single measurement of value of polarizing D.C. current and resulting polarization voltage. The requirement for resolving operations is simplified to measurement of the corrosion current through characteristic proportionality of the interface electrode system applied to measured value of polarizing D.C. current and resulting polarization voltage.

The action of a corrosion accelerator dissolved in the ionic conductor may be measured by the method of this invention through an anodic corrosion current obtained from measurement of anodic current-potential relationship of the corrosion interface and a cathodic corrosion current obtained from measurement of cathodic current-potential relationship of the corrosion interface.

The art contains ample evidence that oxygen dissolved in a corrosive can appreciably accelerate the corrosion rate and can frequently after the physical form through which the metal surface is corroded. In the absence of dissolved oxygen, corrosion generally proceeds uniformly over the entire exposed metal surface. If the corrosion product is insoluble, it tends to be formed uniformly over the entire metal surface. The presence of dissolved oxygen favors non-uniform corrosive action consequent to any factor which tends to interfere with uniform access of oxygen to the metal surface. When the corrosion product is insoluble in the presence of dissolved oxygen, a point on the metal surface at which it is initially formed becomes partially shielded from the oxygen and remains at a potential more anodic than the remainder of the metal surface to which oxygen is readily available. A localized anodic area of intensified corrosion rate is formed, and a local corrosion current flows within the corrosive from this anodic area to the remainder of the metal surface then operating as a cathode. As the corrosion proceeds, the anodic area tends to expand, and when it expands slowly the corrosion may become confined to a pitting action.

The art includes several alternative laboratory techniques for demonstrating that localized corrosion operates in part through the mechanism of a short-circuited two-electrode battery. Laboratory conditions are selected to produce a localized area of intensified attack, sufficiently stabilized within a visible boundary to permit removal of the entire metal surface from the corrosive, mechanical separation of the area of intensified attack from the remaining area for electrical insulation from it, the connection of an insulated electrical lead wire to each area, and return of the assembly to the corrosive for measurement as a two-electrode battery, during the short period through which the intensified attack remains confined within its initial boundary. Demonstration is thereby made that the area of intensified attack is anodic to the remaining surface area, and that the short-circuit current contributes toward determining the corrosion rate. The laboratory technique required for such demonstration is more complicated than weight loss measurement, and cannot be applied to the forms in which localized corrosion occurs in practice.

The art regards the formation and operation of the localized anodic area to require a localized reduction of oxygen concentration, and has not regarded the anodic dissolving of metal to be accelerated through anodic reaction with oxygen. The art is aware that little if any hydrogen evolution occurs in the presence of oxygen acceleration, and deduces that dissolved oxygen reacts chemically with nascent hydrogen formed at the cathode surface by cathodic electrochemical reaction, to accelerate the corrosion rate through diminution of cathode area shielding by molecular hydrogen.

Measurement of corrosion accelerator action by the method of this invention differs considerably from the art. The anodic corrosion current and the cathodic corrosion current measured in the presence of accelerator action by the method of this invention differ from the short-circuit current that art can momentarily measure by the technique of converting localized corrosion to a two-electrode battery. The corrosion currents measured by the method of this invention can be measured in the absence of visual evidence of localized corrosion accompanying the accelerator action, and can be measured in the presence of visual evidence of localized corrosion, in each case non-destructively without disturbing the corrosion interface. Measurements made by the method of this invention indicate that the accelerator action of dissolved oxygen is not confined to chemical reaction with nascent hydrogen, and indicate that it includes electrochemical reaction in the form of electron acceptance by the oxygen. Such electron acceptance by dissolved oxygen is regarded to accompany the cathodic electrochemical reaction of electron acceptance by hydrogen ions and also to accompany the anodic electrochemical reaction of electron removal in metal ion formation, with measurement of the extent of this electron acceptance by oxygen in cathodic reaction and in anodic reaction regarded to be included with corrosion rate measurement by the method of this invention.

Distinctive advantages are produced through this simplified method of corrosion current measurement. The measured value of polarizing D.C. current may be less than the value of the corrosion current being measured, to minimize disturbance of the corrosion interface properties. The corrosion current may be measured within the substantially instantaneous time lapse of about two minutes. The corrosion current may be continuously measured through the time interval within which the polarizing D.C. current does not unduly alter properties of the corrosion interface. The method may be operated through a measurement device of small size and weight, made simple to operate, with the meter measuring the polarizing D.C. current being operated to directly indicate the value of the corrosion current being measured. The method may be operated through a measurement device producing continuous recording of variation in corrosion current with passage of time.

PRELIMINARY DESCRIPTION

The method described herein is based upon an electrode system in which measurement is made of an interface electrode system characterized by interface electrodes having free electrode potentials of $0.02 \pm 0.002$ volt separation and by inter-related anodic and cathodic polarizabilities of these interface electrodes described and measured by a line slope voltage of $0.02 \pm 0.002$ volt, and found to operate through these characteristics without restriction to interface composition and conditions of operation. This interface electrode system defines an additional characteristic property of the corrosion interface, which is here termed the direct voltage, and which is equal to the sum of the anodic and cathodic polarization voltages produced on a corrosion interface by a value of anodic and cathodic polarizing D.C. current equal to the value of the corrosion current of the interface electrode system when the corrosion interface corrodes at its free electrode potential. Additionally, this value of polarizing D.C. current produces anodic and cathodic polarization voltages of practically equal values when the corrosion interface is operated in the absence of corrosion acceleration such as that of dissolved oxygen. The direct voltage occurs within the initial range of practically linear relationship between value of polarizing D.C. current passed through the corrosion interface and value of resulting polarization voltage produced across the interface. A single measurement of polarizing D.C. current and resulting polarized electrode potential made within this range, with polarization voltage measured from additional measurement of the free electrode potential of the corrosion interface, produces measurement of the corrosion current through this linearity of current-potential relationship when related to the characteristic value of the direct voltage. This measurement method, here termed the simplified method, may be operated through alternative electrode systems adaptable to making measurements in laboratory and plant equipment handling corrosives.

The method may be operated through the combination of a corrosion interface to be measured, a separate opposed and unmeasured interface, and a separate reference electrode.

Another combination includes a corrosion interface to be measured with a separate opposed and unmeasured interface which remains practically unpolarized.

When the electronic-ionic conductor interface corrodes in the presence of accelerator action such as oxygen dissolved in the ionic conductor, the effect of the acceleration is to increase the anodic and cathodic conductors, with the greater increase occurring to the anodic conduction. The simplified method then measures a value of accelerated corrosion current through cathodic polarization of the corrosion interface, and measures a still larger value of accelerated corrosion current through anodic polarization of the corrosion interface. An explanation of the cause and significance of the two corrosion currents thus measurable, is made by reference to principles of interface electrode system performance. In general, the corrosion current determining the accelerated corrosion rate is measured from the square of the anodically measured corrosion current divided by the cathodically measured corrosion current, and this simple mathematical relationship is in accord with regarding electron acceptance by the dissolved oxygen to occur with the anodic release of electrons in metal ion formation in the same proportion that it is regarded to occur with the cathodic delivery of electrons in hyrdogen ion discharge. Occasionally, the corrosion current determining the corrosion rate is found to be equal to the anodically measured corrosion current, and such performance is regarded to occur when electron acceptance by oxygen does not occur with the anodic formation of metal ions. Certain corrosion interface compositions can be operated under conditions in which the corrosion current determining the corrosion rate is found to be less than the anodically measured corrosion current, and such performance is regarded to be caused by deposition in cathodic reaction of some of the metal ions released in anodic reaction.

This simplified method can measure corrosion current without sacrifice in accuracy of corrosion rate measurement when compared with such corrosion current measurement made from measurement of the transition point occurring at minimum polarization voltage and followed by resolving operations to produce the current measurement, as described in a preceding division of this invention.

THE FIGURES

The following figures originate with the preceding division of this invention, and are repeated here to describe the measuring equipment and the principles upon which the simplified method operates, FIGURE 1 is a diagrammatic section illustrating essential components of measuring apparatus;

FIGURE 2 is a graph showing variations in shape of initial current-potential relationship range when measured by the method described in the preceding division of the invention;

FIGURE 3 shows undistorted ranges of anodic and cathodic current-potential relationship measured by the method described in the preceding division of this invention, and shows the corrosion mechanism of the interface electrode system obtained therefrom by operations of resolving also described in the preceding division.

BASIS OF SIMPLIFIED METHOD OPERATION

The value of the direct voltage, upon which operation of the simplified method relies, is determined as follows. Referring to FIGURE 3, point 37 measures a 40 unit corrosion current operating at free electrode potential $E_f$ of the corrosion interface on which undistorted current-potential relationship ranges $E_f$–C and $E_f$–A were measured. In FIGURE 2 a current line is extended from this 40 unit value of current to a point 38. The voltage intercepted along this current line by undistorted current-potential relationships $E_f$–C and $E_f$–A is equal to the sum of the anodic and cathodic polarization voltages produced by a polarizing D.C. current of 40 current units, and is shown to be 0.029 volt. This is a characteristic voltage, because the current-potential relationships of FIGURES 2 and 3 are independent of graphical dimension of voltage unit and of current unit, and are independent of the ampere value of the current unit. The characteristic $0.02 \pm 0.002$ volt separation between free electrode potentials of interface electrodes and the characteristic $0.02 \pm 0.002$ volt value of line slope voltage of the interface electrode system determine the value of the direct voltage independently of specific value of current unit. The 40 unit current distance on these graphs may represent 4, 40, 400, or any other microampere value of current measured on a specific corrosion interface of specific area. This direct voltage may also be defined from the extension of initial lines $E_f$–17 and $E_f$–18 of undistorted current-ptoential relationships $E_f$–C and $E_f$–A, which intercept 0.031 volt along the current line at 40 current units.

In practice, free electrode potential $E_f$ may vary appreciably throughout the duration of the corrosion. Variations of several tenths of a volt are not uncommon. In effect, this means that potential $E_f$ may occur at any potential between the free electrode potentials $P_{a1}$ and $P_{c1}$ of consecutive interface electrodes. It can be shown by graphical or mathematical analysis, based upon the geometric proportionalities through which the interface electrode system operates, that the effect of potential $E_f$ variation within the range $P_{a1}$–$P_{c1}$ does not significantly alter the value of the direct voltage $E_d$.

Another principle upon which the simplified method operates is that only a small amount of distortion of current-potential relationship may occur within a corrosion interface of unspecified composition and operation when polarized by a value of D.C. current equal to the value of the corrosion current of the interface electrode system operating at the free electrode potential of the corrosion interface. Reference is made to FIGURE 2 which shows various shapes of distorted current-potential relationships compared with undistorted relationships $E_f$–C and $E_f$–A. The distorted relationships are shown in the position of coinciding transition point potentials and free electrode potential, and with current units graphically proportioned so that the corrosion current operating at the free electrode potential of the measured corrosion interface coincides with the 40 unit current value defined in FIGURE 3 by point 37. Undistorted cathodic current-potential relationship $E_f$–C and distorted current-potential relationship $E_f$–C″ intersect the 40 unit current line at substantially the same potential. Undistorted anodic current-potential relationship $E_f$–A and distorted relationship $E_f$–A′ also intersect the 40 unit current line at substantially the same potential. Some forms of distortion, illustrated by current-potential relationship $E_f$–C′ may occur to a small extent within the initial range of the polarizing D.C. current. Distorted relationship $E_f$–C′ and relationship $E_f$–A intercept 0.035 volt along the 40 unit current line.

Another principle upon which the simplified method operates is the observation that the direct voltage is defined from approximately equal values of cathodic polarization voltage and anodic polarization voltage. This is illustrated in FIGURE 2 by the showing of 0.015 volt of anodic polarization, and cathodic polarization ranging from 0.015 to 0.021 volt. The corrosion current occurring at the free electrode potential of a corrosion interface may accordingly be measured as equal to that value of polarizing D.C. current producing an anodic or cathodic polarization voltage equal to one-half of the direct voltage.

A further principle upon which the simplified method operates is that the relationship between polarizing D.C. current passed through the corrosion interface and the resulting polarization voltage produced within the range extending from zero to about 0.03 volt may be regarded as practically linear for present purposes. Referring to FIGURE 2, the extent of line slope change occurring at transition points 17 and 17′ of measured cathodic current-potential relationships is relatively small. The same is true of line slope change occurring at transition point 18 of measured anodic current-potential relationship. It is not too inaccurate to view current-potential relationship between points $E_f$ and 19, $E_f$–19′, and $E_f$–19″, and between points $E_f$ and 20 as being linear for present purposes. Proportionalities of triangular relationship may then be applied to measure values of polarizing D.C. current and resulting polarization voltage ranging up to about 0.03 volt, as follows. The value of the corrosion current operating when the corrosion interface corrodes at its free electrode potential is related to the measured value of anodic or cathodic polarizing D.C. current passed through the corrosion interface in the proportion that one-half of the direct voltage is related to the measured value of the resulting polarization voltage produced by the polarizing D.C. current.

CURRENT-POTENTIAL RELATIONSHIP MEASUREMENT

The simplified method may be operated within a wide range of precision, from qualitative measurement to precision or quantitative measurement. Little additional effort is required to obtain high precision of measurement, and the details of producing such measurement are described below with the obvious understanding that principles employed may be applied in varying degree.

The corrosion interface to be measured is formed by contacting a single surface of electronic conductor 1 with ionic conductor 2. The separate and opposed interface required for passing the polarizing D.C. current through the interface to be measured is formed by contacting a surface of electronic conductor 3 with ionic conductor 2.

The area of the interface to be measured and the area of the separate and opposed interface are formed with a combination of regularity in shape, size, and opposed position selected to produce small range of variation in value of polarized electrode potential subsequently produced on the interface to be measured by the polarizing D.C. current passed between the two opposed interfaces. The accuracy of corrosion current measurement depends upon the extent to which the measured value of polarized electrode potential is indicative of the potential of the entire interface area. When localized corrosion occurs within the interface to be measured, the localized areas of potential dissimilarity are short-circuited through paths of ionic conduction producing small IR voltage drops measurable as a small range of variation in the free electrode potential, and the polarized electrode potential will occur with correspondingly small range of variation. The uniformity in forming the paths of ionic conduction passing the polarizing D.C. current between the two opposed interfaces is limited to maintaining range of variation of voltage delivered to the measured interface within range of variation occurring to the free electrode potential.

FIGURE 1 illustrates one combination in which the measured interface and the separate and opposed interface are formed from rod electrodes of identical dimensions, with rod diameter made small compared to rod length and with major axes placed in parallel relationship. Rod diameter is diminished with decrease of ionic conductor conductivity, and may range from about one centimeter with ionic conductors of good conductivity to about two millimeters with ionic conductors of small conductivity approaching that of distilled water. The interface area is produced primarily through selection of rod length.

The reference electrode required for electrode potential measurement is established within the ionic conductor at a separation distance from the measured interface sufficient to include total polarization voltage produced on the measured interface by the polarizing D.C. current. A separation distance of no less than about ⅛ inch has proven satisfactory, and is regarded to include mechanical and concentration polarizations. The separation distance also tends to produce an average measurement of the range of variation within which the electrode potential may occur.

The reference electrode is also positioned to substantially exclude voltage produced by ionic conductor resistance to the conduction of the polarizing D.C. current. When potentials are measured from a separate reference electrode 4, IR voltage drops through the ionic conductor can be substantially eliminated by positioning reference electrode 4 behind electrode 1, as is shown in FIGURE 1. When electrode 3 is made practically unpolarizable by the measured value of polarizing D.C. current and is also operated as the reference electrode, ionic conductor resistance between electrodes 1 and 3 should be minimized by positioning electrode 1 within about ¾ inch separation distance from electrode 3, or by surrounding electrode 1 with the electrode 3 interface in the form of the wall of a pipe, tank, or similar surface.

The corrosion current may be measured at any instant of time selected after electronic conductors 1 and 3 are placed in contact with ionic conductor 2.

The free electrode potential $E_f$ of the corrosion interface generally varies with time, and small variations in potential $E_f$ may represent a large portion of the comparatively small polarization voltage to be measured. When accurate corrosion current measurement is required, a first measurement is made of the potential $E_f$ in the form of the voltage difference between the electronic conductor of the interface to be measured and the electronic conductor of the reference electrode.

A D.C. voltage of selected polarity is then applied to electronic conductors 1 and 3 through a voltage delivery system selected from a class which promptly produces approached equilibrium in the form of slow rate of change of the current-potential relationship, to polarize the interface to be measured by a voltage within the range from slightly above zero to about 0.03 volt at the time of measurement. Two classes of voltage delivery system meeting this requirement are broadly illustrated in FIGURE 1 by battery 12, battery switch 13, potentiometer 14 and polarity reversing switch 16 as follows.

One class of voltage delivery system promptly producing approached equilibrium of current-potential relationship delivers the D.C. voltage with a definite extent of voltage regulation. Referring to FIGURE 1, when potentiometer 14 is of low resistance, the D.C. voltage initially applied to the electrodes from a selected potentiometer arm position remains substantially constant, and the current-potential relationship promptly approaches equilibrium in the form of decreasing rate of change of decreasing polarizing D.C. current. When potentiometer 14 is of intermediate resistance, the D.C. voltage initially applied to the electrodes increases and the polarizing D.C. current decreases, and the current-potential relationship promptly approaches equilibrium in the form of decreasing rate of change of decreasing polarization voltage and decreasing rate of change of decreasing polarizing D.C. current. When potentiometer 14 is of high resistance, the D.C. voltage initially applied to the electrodes increases from a small value while the polarizing D.C. current may undergo little change, and the current-potenial relationship promptly approaches equilibrium in the form of decreasing rate of change of increasing polarization voltage. A definite extent of voltage regulation may alternatively be produced by manual adjustments made to the potentiometer arm after application of the D.C. voltage, as through adjustments made to maintain the applied voltage constant, or as through adjustments made to maintain the polarizing D.C. current constant.

Another class of D.C. voltage delivery system produces prompt approach of the current-potential relationship toward equilibrium by continuously delivering the D.C. voltage at a substantially constant rate of change not exceeding the selected slow rate of change at which measurement is made of the polarizing D.C. current and the resulting polarized electrode potential. The arm of potentiometer 14 is driven at a selected constant speed to deliver the D.C. voltage at the selected rate of change.

A voltage delivery system may be selected from either of these classes described above, without altering the accuracy of the corrosion current measurement. The class continuously delivering the D.C. voltage at constant rate of change offers no advantage to the simplified method described herein, and has the diadvantage of limiting the time for making the measurements to the time within which the resulting polarization voltage remains within the range for measurement by the simplified method.

Measurement may be made of the value of polarizing D.C. current and resulting polarized electrode potential as soon as the current-potential relationship initially approaches a rate of change slightly greater than that produced by rate of change of the corrosion rate. The simplified method may be operated at such low density of polarizing D.C. current that rate of current-potential relationship distortion by the D.C. current generally becomes negligible. Rate of change of the corrosion rate may vary from small value with fixed ionic conductor composition and fixed corrosive environment, to larger values when measurement is made during changing ionic conductor composition or changing corrosive environment.

With a voltage delivery system of the class delivering the D.C. voltage with definite extent of voltage regulation, a convenient practice is to observe rate of current-potential relationship change during 30 second intervals through readings of D.C. current or polarized electrode potential, whichever is made most indicative by the extent of the voltage regulation. Measurement may be made of value of polarizing D.C. current and resulting polarized electrode potential as soon as the current-potential relationship has approached a constant rate of change. This constant rate of change may range from about 0.2% to 2% during the 30 second time interval, depending upon rate of change occurring to the corrosion rate.

With a voltage delivery system of the class continuously delivering the D.C. voltage at a constant rate of change, the constant rate of change in voltage delivery may range from about 0.015 volt per minute to slower rates delivered to electrodes 1 and 3 when of comparable polarizability, and measurement is made of the value of polarizing D.C. current and resulting polarized electrode potential at any selected instant of time when the polarization voltage is within the measurement range of the simplified method.

Upon the completion of intended measurements, the applied D.C. voltage is generally removed to permit the corrosion interface to continue the corrosion at the free electrode potential.

The value of the polarization voltage is calculated as the voltage difference between measured value of polarized electrode potential and measured value of free electrode potential.

The corrosion current indicative of corrosion rate at the free electrode potential of the electrode 1 interface may be continuously measured from continuous measurement of the current-potential relationship when measurement error which can originate from change of free electrode potential with time, is substantially eliminated from the polarization voltage measurement. In general, the free electrode potential of the electrode 1 interface will change with the passage of time, particularly during initial hours of the corrosion. This free electrode potential may undergo large change during progress of the corrosion if change is made in composition of the ionic conductor or in corrosive environment while the corrosion continues uninterrupted. The effect of change in free electrode potential is substantially eliminated in the polarization voltage measurement by establishing reference electrode 4 in the form of the same material as electronic conductor 1 and immersed in ionic conductor 2. The free electrode potentials of electrodes 1 and 4 are then substantially equal. When the polarizing D.C. current is passed through the electrode 1 interface, the potential difference between electrodes 1 and 4 is that between the polarized electrode potential and the free electrode potential, which difference is the polarization voltage produced across the electrode 1 interface.

One alternative in the method for continuously measuring the relationship between polarizing D.C. current and polarization voltage may be carried out as follows. Reference electrode 4 is established in the form of the same material as electronic conductor 1, and is immersed in ionic conductor 2. A D.C. voltage is applied between electrodes 1 and 3, and is adjusted to produce a polarization voltage within the range from slightly above zero to about 0.03 volt. After the current-potential relationship undergoes substantially no change over a small time interval, measurement may be made continuously of the polarization voltage and the polarizing D.C. current, over that period of time throughout which the polarization voltage remains within the range from slightly above zero to about 0.03 volt. When electronic conductor 3 is of material different from that of electronic conductor 1, the D.C. current will be a function of the corrosion rate of the electrode 1 interface, any change made in the ohmic resistance of the ionic conductor, the change in free electrode potentials between electrodes 1 and 3 which determines open-circuit cell voltage, and the corrosion rate of the electrode 3 interface, so that current measurement must be included with polarization voltage measurement. When the material of electronic conductor 3 does not differ from that of electronic conductor 1, the D.C. current will be a function of the corrosion rate of the electronic conductor 1 interface, and any change which may be made in the ohmic resistance of the ionic conductor. With an unaccelerated ionic conductor, the measurements will produce results similar to those described in my co-pending patent application Serial Number 840,239, filed October 22, 1959, and the method of this present invention is more advantageous in that it can continuously produce measurement of corrosion current $i_a$ or of corrosion current $i_c$ when an accelerator in the ionic conductor causes current $i_a$ to become larger than current $i_c$.

Another alternative in the method for continuously measuring the relationship between polarizing D.C. current and polarization voltage may be carried out with a D.C. voltage delivery system which produces a substantially constant value of polarizing D.C. current passed between electrodes 1 and 3. The value of this D.C. current is adjusted to produce a polarization voltage selected from within the range of slightly above zero to about 0.03 volt, and the value of the current is measured. After the current-potential relationship undergoes substantially no change over a small time interval, continuous measurement is made of the polarization voltage, which may range from about 0.001 to 0.03 volt in measurement of an unaccelerated corrosion current varying within a 30 to 1 range. Various electro-mechanical means are known to the art for holding substantially constant a value of D.C. current delivered from a battery. A simpler alternative for holding the D.C. current constant is illustrated through FIGURE 1, and operates on the principle that variations in the ohmic resistance between electronic conductors 1 and 3, including the polarization voltage resistances of electrodes 1 and 3 and any changes which may be made in the ohmic resistance of the ionic conductor during progress of the corrosion, are made negligible in comparison to the value of an ohmic resistance connected in series with the source of D.C. voltage. The total series resistance to which the source of constant D.C. voltage is connected then remains substantially constant, in turn causing the D.C. current passing between electrodes 1 and 3 to remain substantially constant. The range within which corrosion current is usually measured, may be covered by two continuous measurement ranges. A constant 2 microampere polarizing D.C. current will measure corrosion current ranging from 1 to 30 microamperes, and a constant 60 microampere polarizing D.C. current will measure corrosion current ranging from 30 to 900 microamperes. The maximum ohmic resistance between electrodes 1 and 3 may be approximately defined from a polarizing D.C. current of 1 microampere producing 0.03 volt polarizations on electrodes 1 and 3, and negligible IR loss through the ionic conductor. According to Ohm's law, cell resistance would be, $R = E/I = 2(0.03)/(1 \times 10^{-6}) = 60,000$ ohms. If this resistance is 1% of the total series resistance to be introduced into the circuit, the value of this series resistance would be about 6 megohms. The voltage drop across this resistance would be $IR = (1 \times 10^{-6})(6 \times 10^6) = 6$ volts, which can be supplied from a battery.

Still another alternative in the method for continuously measuring the relationship between polarizing D.C. current and polarization voltage may be carried out through an electro-mechanical device which continuously adjusts value of polarizing D.C. current to maintain a constant value of polarization voltage selected from within the range of slightly above zero to about 0.03 volt. The value of this polarizing D.C. current is then a continuous measure of the corrosion current through the multiplication ratio of $(\tfrac{1}{2}E_d)/$(polarization voltage).

The length of time through which continuous measurement may be made is generally unlimited, since the value of the polarizing D.C. current is generally less than the corrosion current being measured, and is too small to disturb the electrochemical performance of the electrode 1 interface. The effect of continuous measurement on the corrosion rate can be easily determined by removing the applied D.C. voltage of the continuous measurement during a small time interval to allow the corrosion interface to corrode at an entirely undisturbed rate, and then resuming the continuous measurement. If this interruption of continuous measurement does not significantly alter the trend of the corrosion current, it is reasonable to conclude that the continuous measurement is introducing negligible error in measurement of the corrosion current.

ALTERNATIVE INTERFACE COMBINATIONS FOR MEASUREMENT

The simplified method may be operated through various combinations applied to forming the corrosion interface to be measured, the separate and opposed interface for passing the polarizing D.C. current, and the reference electrode interface for electrode potential measurement, as follows.

In one combination, the corrosion interface area to be measured is formed with electronic conductor 1, the separate and opposed interface for passing the polarizing D.C. current is formed with electronic conductor 3, and the reference electrode interface for electrode potential measurement is formed with separate electronic conductor 4. This combination is advantageous with ionic conductors of small conductivity, through introducing negligible IR voltage from ionic D.C. current conduction into measured value of resulting polarized electrode potential by positioning electronic conductor 4 to locate electronic conductor 1 between electronic conductors 3 and 4, as shown in FIGURE 1.

Electronic conductor 3 may be of composition other than that of electronic conductor 1, and then should not alter the properties of the corrosion interface to be measured. Corrosion products of electronic conductor 3 should not enter into replacement reaction with the substance of electronic conductor 1, or form a protective film within the electronic conductor 1 interface. The possibility of hydrogen or oxygen liberation within the electronic conductor 3 interface should not alter the corrosivity of ionic conductor 2 much more than that produced by the electronic conductor 1 interface.

The requirements for opposed electrode 3 can be broadened considerably when the potentials of electrode 1 are measured by a separate reference electrode 4. Ionic conductor resistance between electrodes 1 and 3 does not then introduce error in potential measurement of electrode 1. The spacing between electrodes 1 and 3 can be increased to obtain additional advantages, and the small increase in applied D.C. voltage required to overcome the increased ionic conductor resistance introduces no disadvantage and may even be negligible when compared to the potential difference between electrodes 1 and 3 when they are taken in the form of different electronic conductor compositions.

One advantage gained by increasing the spacing between electrodes 1 and 3 is that the shape and size requirements of electrode 3 become less critical as the separation distance is increased. At the same time, the uniformity of polarized electrode potential produced on electrode 1 is not adversely affected.

Other advantages pertain to separation of the electrode 3 interface from the electrode 1 interface. Electrode 3 may be established within a separate volume of ionic conductor. When a measurement is to be made, electrode 3 may be connected to the electrode 1 interface by ionic conductor contact through an ionic conductor bridge, and this connection may be removed after the measurement is made. This avoids contamination of the electrode 1 interface by corrosion products from the electrode 3 interface. It also broadens workable range of composition and operation of the electrode 3 interface, and permits separation of environment factors between the electrode 1 and electrode 3 interfaces, such as temperature and flow rate. The ionic conductor bridge may range in form from the simplicity of a strip of filter paper to refinement in the form of a bent glass tube with non-contaminating junction made by means applied to ionic conductor junctions made with reference electrodes.

The paths of current flow between electrodes 1 and 3 are determined by the position at which electrode 3 in effect operates within the ionic conductor forming the electrode 1 interface. The position at which electrode 3 operates may be such that it is in direct contact with the ionic conductor, or ionic conductor contact may be indirectly through the bridge junction.

Electronic conductor 4 may be in direct contact with ionic conductor 2, and then should not alter the properties of the corrosion interface to be measured. Alternatively, electronic conductor 4 may contact ionic conductor 2 through a reference electrode ionic conductor, and then means should be employed to prevent contamination of ionic conductor 2 such as jelling the reference electrode ionic conductor in a capillary tip.

Measurement is made with this combination of interfaces as follows. The free electrode potential is measured between electronic conductors 1 and 4. Voltmeter 9 is of a class requiring negligible actuation current. Switch 11 connects the voltmeter across electronic conductors 1 and 4. The reversing switch 10 may be required if voltmeter 9 measures D.C. voltage of single polarity. The D.C. current passed between electronic conductors 1 and 3 may polarize the electronic conductor 1 interface within the range from slightly above zero to about 0.03 volt. Value of polarizing D.C. current is measured by meter 15. The resulting polarized electrode potential is measured between electronic conductors 1 and 4. The corrosion current operating when the electronic conductor 1 interface corrodes at its free electrode potential is then related to the measured value of polarizing D.C. current in the ratio that ½ of the direct voltage is related to the polarization voltage calculated from the measured values of the resulting polarized electrode potential and the free electrode potential.

In another combination, the corrosion interface area to be measured is formed with electronic conductor 1, the separate and opposed interface for passing the polarizing D.C. current is formed with electronic conductor 3, and the reference electrode interface for electrode potential measurement is the electronic conductor 3 interface, in which this interface is made of composition and operation to substantially resist polarization by measured value of polarizing D.C. current, and in which the separation distance between the electronic conductor 1 interface and the electronic conductor 3 interface is limited to that introducing negligible IR voltage drop from ionic D.C. current conduction into measured value of resulting polarized electrode potential. This combination is advantageous when measurement is made in industrial equipment having containing walls of metal, such as pipes and tanks.

The interface formed by electronic conductor 3 may be made substantially unpolarizable by the combined factors of interface area and interface corrosion rate. When electronic conductor 3 corrodes at a rate comparable to electronic conductor 1, the polarization of the electronic conductor 3 interface may be held to about one tenth that of the electronic conductor 1 interface by forming the electronic conductor 3 interface area of size ten times greater than the electronic conductor 1 interface. Electronic conductor 1 may be in the form of a rod positioned along the major axis of a pipe, with the inside pipe surface forming the electronic conductor 3 interface. The electronic conductor 3 interface may be formed by a tank wall near which electronic conductor 1 is positioned. The effective interface area formed by an electronic conductor 3 surface is generally limited by IR voltage loss through the ionic conductor to about ten times that of the electronic conductor 1 interface area. This invention shows that initial range of interface polarizability is inversely related to corrosion rate, and decreased polarization resistance may additionally be achieved through an electronic conductor 3 interface of larger corrosion rate than that of the electronic conductor 1 interface. Alternatively, electronic conductor 3 may form a reversible unpolarizable interface with a second ionic conductor, with this second ionic conductor contacting ionic conductor 2 through a non-contaminating junction.

Electrode potential measurements are made with this combination as follows. Voltmeter 9 is connected across electronic conductors 1 and 3 through switch 11. The free electrode potential and the polarized electrode potential of the electronic conductor 1 interface are measured between electronic conductors 1 and 3. The corrosion current operating when the electronic conductor 1 interface corrodes at its free electrode potential is obtained through the same relationship as that described for the preceding combination of measured interfaces.

RATE MEASUREMENT BY CORROSION CURRENT

The method of this invention can measure various corrosion currents of the interface electrode system which characterize interface corrosion as it occurs in the absence and in the presence of accelerator action such as that of dissolved oxygen. In the absence of such corrosion acceleration, the corrosion current $i_a$, measured from the anodic polarization of the corrosion interface and the corrosion current $i_c$, measured from the cathodic polarization of the corrosion interface, are each substantially equal to the deaerated or unaccelerated corrosion current $i_d$. The deaerated corrosion current $i_d$ is found to directly determine the corrosion rate, except under rare conditions when metal ions formed in anodic reaction are in part deposited in cathodic reaction. Integration of a measured $i_d$-time relationship to a quantity-time relationship through application of Faraday's law of electrolysis produces a quantity-time relationship in accurate agreement with weighable metal loss.

The accuracy with which this simplified method may measure the interface electrode system corrosion current operating at the free electrode potential of the measured corrosion interface is indicated from a consideration of the basis for simplified method operation described earlier in this specification, and leads to the following generalizations.

(1) The accuracy of unaccelerated current $i_d$ measurement made on the electronic conductor 1 interface from a single value of polarizing D.C. current and resulting polarization voltage is increased by a second measurement made with reversed polarity of the polarizing D.C. current.

(2) As the measurement value of the resulting polarization voltage produced on the electronic conductor 1 interface is increased beyond the voltage (½) (direct voltage), the value of the polarizing D.C. current tends to produce increasing distortion of corrosion interface properties occurring before starting the measurement, and thereby to reduce the accuracy of the corrosion current measurement.

(3) Measurement made with the resulting polarization voltage produced on the electronic conductor 1 interface within a range from slightly above zero to about 0.01 volt may tend to improve accuracy through measurement made within the linear range of initial current-potential relationship extending from free electrode potential $E_f$ up to the potential of first transition point 17 or 18 of FIGURE 2, and through a minimizing of current-potential relationship distortion produced by value of polarizing D.C. current, but may also tend to reduce the precision of measuring the smaller values of polarizing D.C. current and resulting polarization voltage.

(4) When the free electrode potential $E_f$ and the resulting polarized electrode potential are measured between electronic conductor 1 and substantially unpolarizable electrode 3, correction may be made for IR voltage loss in ionic conduction of the measured value of the polarizing D.C. current by subtracting a small voltage from the polarization voltage calculated from the two electrode potential measurements. This subtraction is more conveniently accomplished in practice by increasing the ratio of the direct voltage term to the resulting polarization voltage through the addition of a voltage generally up to about 0.006 volt to the direct voltage. The value, $\frac{1}{2}E_d = 0.014 \pm 0.001 + (0 \text{ to } 0.006)$ volt may consequently be taken when electronic conductor 3 is operated as the reference electrode.

(5) Measurement made with a separate reference electrode 4, can eliminate IR voltage drop from ionic conduction of the polarizing D.C. current, and the value, $\frac{1}{3}E_d = 0.015 \pm 0.001$ volt can be taken when polarization voltage is of the order of about 0.01 volt.

The degree of accuracy with which the simplified method is capable of measuring the interface electrode system corrosion current may not be indicated through comparison with the corrosion current of the method measuring initial range of current-potential relationship described in the preceding division of this invention. Measurement by the simplified method may be made with minimum disturbance of corrosion interface properties occurring before measurement. Measurement of initial range of current-potential relationship may slightly disturb interface properties occurring before the measurement. A difference in value of corrosion current measured by these two methods may indicate the extent of disturbance produced by measurement of initial current-potential relationship range.

The accuracy with which the interface electrode system corrosion current measured by the simplified method determines the corrosion rate cannot be directly measured, since no method other than that of the preceding division of this invention is known for measuring corrosion rate, non-destructively and instantaneously. The determination must be made indirectly through comparison with a corrosion quantity-time measurement method, such as the weight loss method; through the following steps.

(1) Measurement is made of the initial weight of electronic conductor 1. When corrosion interface composition and operation include details which minimize difference in weight loss obtained with duplicated corrosion interfaces, opposed electrode 3 may duplicate electrochemically the electronic conductor 1 interface and also be measured.

(2) After forming the electronic conductor 1 and 3 interfaces, a series of corrosion current measurements are made by the method of this invention throughout the progress of the corrosion. Each measurement in this series may be taken in the form of corrosion current $i_a$ measured from anodic polarization, or corrosion current $i_c$ measured from cathodic polarization, or the average of currents $i_a$ and $i_c$. The absence of corrosion acceleration is indicated when $i_a = i_c$ within the precision of their measurement. Designating $i_d$ as the corrosion current operating in the absence of acceleration, $i_d$ may be measured as $i_d=i_a$, $i_d=i_c$, or $i_d=(i_a+i_c)/2$. The $i_d$-time relationship is graphed as it is measured, with the curve drawn through each measured $i_d$-time point so that the trend of the curve can indicate the probable time when another point of $i_d$-time relationship should be measured.

(3) The $i_d$-time curve is integrated to a quantity-time curve through application of Faraday's law of electrolysis, with anodic electrochemical reaction assumed to produce metal ions of the valence found in the corrosion product.

(4) The quantity-time curve thus calculated is applied to determine the duration of the corrosion required to product metal loss weighable within about ±5% precision, which is generally the limit of precision within which metal loss occurs on duplicated electrodes.

(5) When metal loss of selected quantity is indicated by the quantity-time curve, the electronic conductors may be removed from the ionic conductor for weighing. Any adherent corrosion products must be removed before weighing, by means generally known to the art which minimizes further metal loss.

The method of this invention is capable of measuring quantity-time relationship within about ±5% accuracy in correlation with weight loss of about ±5% precision. In the absence of corrosion acceleration, current $i_d$ is found to accurately determine the quantity-time relationship. In certain rare instances, corrosion current $i_d$ has been found to operate through a valence other than that of the corrosion product. In instances probably encountered more frequently in laboratory investigations than in actual industrial corrosion, corrosion interface composition and operation may cause some of the metal ions formed in anodic electrochemical reaction to be deposited in cathodic electrochemical reaction, and such is indicated when weighed metal loss is less than that indicated from current $i_d$. In the presence of corrosion acceleration such as that produced by oxygen dissolved in the ionic conductor, corrosion current $i_a$ becomes greater than corrosion current $i_c$, and current $i_c$ becomes greater than current $i_d$, with the consequence that the $i_d$-time relationship is no longer measurable from $i_a$ or $i_c$.

The non-destructive instantaneous corrosion current measurement by the method of this invention permits measurement of the effect of a corrosion variable operating to change the corrosion rate of the corrosion interface while the value of the corrosion variable is changed in a selected manner through a selected range. The corrosion variable may pertain to ionic conductor composition, as inhibitor concentration, pH value, salt concentration, or other variables. The corrosion variable may pertain to corrosion environment, as temperature, flow rate, or other variables. Detailed information is thus obtained with a minimum of time and effort before weighable quantity of metal loss may occur.

The preceding portion of the specification describes the basis for operation of the simplified method, the method details of measuring value of the polarizing D.C. current and resulting polarization voltage, and alternative interface combinations through which the method may be applied. The principal purpose of the examples which follow is to cite specific evidence of the scope and accuracy of the corrosion rate measurements.

*Example 1.—Separate reference electrode, continuous voltage delivery*

The main purpose of this example is to illustrate measurement of the corrosion current made with a separate reference electrode 4, with the D.C. voltage delivered continuously at a small constant rate of change, and to illustrate the accuracy of measurement indicated through correlation with weighed metal loss.

Electronic conductor 1 was steel sheet in the form of a strip 1.0 centimeter wide and 2.5 centimeters long, with both faces and three edges exposed. Electronic conductor 3, operated as the opposed and unmeasured interface, was a duplication of electronic conductor 1 so that its weight loss could be included in the data. Electrode surfaces were polished with #300 emery paper, and each electronic conductor was weighed. An electrical lead wire was soldered to a tab portion of each electronic conductor, and the wire and tab were mounted in a glass tube and sealed with wax. Major axes of the electrodes were vertically positioned at 1 inch separation with faces of the electrodes in a common plane, permissible with the high conductivity of the ionic conductor.

The ionic conductor was 1-normal sulphuric acid made up with distilled water. It was initially deaerated by heating to boiling temperature under a layer of white mineral oil, then cooled to room temperature and partially protected from atmospheric oxygen during the corrosion by a ¼ inch layer of the oil. The electrode surfaces were lightly scrubbed with wet pumice powder to produce surfaces free from "water-break," and then lowered into the ionic conductor through the oil layer. The film of water on the electrode surfaces avoided adhesion of the oil.

The corrosive environment included complete submersion of electrode surfaces, no flow of ionic conductor, maintained deaeration, and temperature of 22° C.

A saturated calomel reference electrode 4 of non-contaminating junction was positioned about ¼ inch from electrode 1, and located so that electrode 1 was between electrodes 4 and 3. Free electrode potential $E_f$ was measured just before applying the D.C. voltage.

The voltage delivery system consisted of a potentiometer and center-tapped resistor each connected across the battery. The arm of the potentiometer was driven at constant speed. The voltage applied to the electronic conductors was taken from between the center-tap of the resistor and the arm of the potentiometer.

This voltage delivery system was adjusted to initially apply D.C. voltage to electronic conductors 1 and 3 of more than 0.02 volt. The voltage was then delivered at the substantially constant rate of change of about 0.007 volt per minute which decreased the applied D.C. voltage to zero and then increased it in reversed polarity. Measurement was made of the polarizing D.C. current $i_p$, and the resulting polarized electrode potential $e_m$, at an instant of time during the cathodic polarization of the electronic conductor 1 interface and also at an instant of time during the anodic polarization. These measurements were made at 6.0, 35.5, and 59.0 hours after starting the corrosion. The corrosion was terminated at 60.0 hours. Throughout this duration the electrodes remained in undistrubed contact with the ionic conductor.

The data of the measurements is summarized in Table 1 which follows. The polarization voltage $e_p$, was calculated as the positive voltage difference between potentials $e_m$ and $E_f$. The corrosion current $i_m$ was then related to the polarizing D.C. current $i_p$ in the ratio that (½) (direct voltage), taken as 0.016 volt, was related to the polarization voltage $e_p$. The values of $i_m$ obtained with cathodic polarization and with anodic polarization are shown in Table 1, with the average value of $i_m$ calculated from them.

TABLE 1.—DATA SUMMARIZING CORROSION CURRENT MEASUREMENT OF A SINGLE CORROSION INTERFACE

| Time of measurement, hours | Polarization Polarity | Volts | | | Microamperes | | |
| --- | --- | --- | --- | --- | --- | --- | --- |
| | | $e_m$ | $E_f$ | $e_p$ | $i_p$ | $i_m$ | Average $i_m$ |
| 6.0 | Cathodic | 0.504 | 0.492 | 0.013 | 120 | 160 | 160 |
| | Anodic | 0.482 | 0.492 | 0.010 | 100 | 160 | |
| 35.5 | Cathodic | 0.508 | 0.495 | 0.013 | 230 | 284 | 507 |
| | Anodic | 0.486 | 0.495 | 0.009 | 410 | 730 | |
| 59.0 | Cathodic | 0.506 | 0.495 | 0.011 | 320 | 465 | 553 |
| | Anodic | 0.486 | 0.495 | 0.009 | 360 | 640 | |

The average value of the corrosion current measured at each of these three time intervals spaced throughout the duration of the corrosion was graphed to a linear current axis and a linear time axis. A smooth curve was drawn through the three points and indicated rapid increase of corrosion rate during the first 40 hours, with a constant rate being approached near 60 hours. The corrosion current was regarded to operate through the anodic electrochemical reaction, $Fe=Fe^{2+}=+2(-)$, so that application of Faraday's law of electrolysis produced calculation of the factor, 0.0104 milligram loss of iron per microampere per ten hours of corrosion. Integration of the corrosion current-time curve with this calculated factor produced a graphed corrosion quantity-time relationship of increasing slope, which predicted a 25.8 milligram iron loss at 60.0 hours.

The corrosion was terminated at 60.0 hours by removal of the electronic conductors, and their surfaces were immediately rinsed and dried. The electrodes were removed from the electrode assemblies, the soldered connection was removed with the solder, and each electrode was weighed. Weighed metal losses were 23.0±0.5 and 24.0±0.5 milligrams. The predicted metal loss of 25.8 mg. is 8% above the 24.0 mg. loss measured by weighing.

The measurement at 6.0 hours illustrates that $i_a=i_c$ in this deaerated ionic conductor. The showing of $i_a$ as being greater than $i_c$ in the other two measurements probably originates from error of several thousandths of a volt in $E_f$ measurement, but it may be noted that this error is compensated for by taking $i_m$ as the averaged value of $i_a$ and $i_c$, for the deaerated condition.

By taking $\frac{1}{2}E_d=0.014$ volt, because IR voltage drop through the ionic conductor was excluded from these measurements, the predicted metal loss becomes $(25.8)(14/16)=22.5$ mg., showing closer agreement with the 23.0 mg. weight loss of the measured electrode 1.

*Example 2.—Separate reference electrode, regulated voltage delivery*

This example illustrates the unaccelerated condition in which $i_a=i_c=i_d$ within the precision of the measurements, and throughout the duration of the corrosion. Particular care was taken to minimize the accelerating action of the trace of dissolved oxygen usually operating during initial hours of the corrosion.

Electronic conductor 1 was of sheet steel 1.0 cm. wide and 2.5 cm. high, with both faces and three edges exposed. Electronic conductor 3 was of the same material and dimensions, for cross-checking weighed metal loss. Electrode surfaces were cleaned with a wet pumice powder scrub, dried, and the electrodes were weighed. A tab portion of each electrode was mounted through a cell cover such as member 6 of FIGURE 1, and sealed to the cover with wax. Major axes of the electrodes were vertically positioned at 1½ inch separation with faces of the electrodes in a common plane.

Reference electrode 4 was in the form of an iron rod of 1/16 inch diameter, mounted through the cell cover and extending vertically into the cell a distance of 2 centimeters. Its mounting position located it in the same plane as the faces of electronic conductors 1 and 3, and it was separated from electronic conductor 1 by a distance of ½ inch at the point which placed electronic conductor 1 between electronic conductors 3 and 4.

Ionic conductor 2 was composed of 5.0 cc. concentrated hydrochloric acid added to 500 cc. distilled water. It was deaerated by covering with a ½ inch layer of white mineral oil, heating to expell dissolved oxygen at the boiling temperature, and was then cooled to room temperature.

The cell cover 6 with electrodes 1, 3 and 4 sealed airtight with wax, was sealed to cell container 5 with wax. The air in the cell was displaced with carbon dioxide. The ionic conductor was introduced into the cell through cell opening 7 by siphon, to completely fill the cell of 400 cc. volume so that gaseous headspace 8 was eliminated. Ionic conductor surface in cell opening 7 was covered with a ½ inch layer of white mineral oil, to maintain deaeration. Throughout the duration of the corrosion the cell stood undisturbed at a room temperature of about 25° C.

At each selected instant of time during progress of the corrosion, measurements were made as follows. The free electrode potential $E_f$ was measured between reference electrode 4 and electronic conductor 1. The sign of this potential was taken in that polarity which gives iron a positive potential when measured from a calomel reference electrode. An anodically polarized electrode potential was selected as the value, $E_f-0.010$ volt. A variable D.C. voltage delivered from a potentiometer was then connected to electronic conductors 1 and 3 in that polarity producing anodic polarization voltage, and the value of this applied D.C. voltage was continuously adjusted to maintain the selected value of anodically polarized electrode potential. The D.C. current passing between electronic conductors 1 and 3 at first decreased rapidly and then approached a slow rate of change. When the value of this D.C. current did not change over a 30 second time interval, measurement was made of the current $i_{ma}$. The D.C. voltage was the removed. A cathodically polarized electrode potential was selected as the value, $E_f+0.010$ volt. The variable D.C. voltage was again connected to electronic conductors 1 and 3 and was adjusted in value to produce cathodic polarization. The above measurement steps were repeated to obtain measurement of the current $i_{mc}$ producing 0.010 volt of cathodic polarization. The corrosion currents $i_a$ and $i_c$ were determined through the proportions, $i_a/i_{ma}=0.014/0.010$, and $i_c/i_{mc}=0.014/0.010$, where $0.014=\frac{1}{2}E_d$ and $0.010=$polarization voltage. The value, $i_d=(i_a+i_c)/2$ was calculated and graphed from linear current and time axes with respect to the total hours of corrosion at the time of making the measurement. Measurements of $i_a$ and $i_c$ were repeated at instants of time selected in view of the trend of the $i_d$-time curve. These measurements are shown in Table 2 which follows.

TABLE 2.—MEASUREMENTS SHOWING ABSENCE OF CORROSION ACCELERATION

| Run No. | Hours of Corrosion | $E_f$ | $e_{ma}$ | Microamps. $i_a$ | $e_{mc}$ | Microamperes $i_c$ | Microamperes $i_d$ |
|---|---|---|---|---|---|---|---|
| 1 | 0.5 | −0.018 | −0.028 | 94 | −0.008 | 85 | 90 |
| 2 | 0.8 | −0.018 | −0.028 | 94 | −0.008 | 88 | 91 |
| 3 | 2.5 | −0.016 | −0.026 | 106 | −0.006 | 101 | 104 |
| 4 | 10.5 | −0.044 | −0.054 | 87 | −0.034 | 79 | 83 |
| 5 | 35.0 | −0.064 | −0.074 | 108 | −0.054 | 119 | 114 |
| 6 | 37.0 | −0.068 | −0.078 | 119 | −0.058 | 119 | 119 |
| 7 | 51.5 | −0.012 | −0.022 | 121 | −0.002 | 120 | 121 |
| 8 | 99.0 | −0.012 | −0.022 | 178 | −0.002 | 184 | 181 |
| Stop | 100.0 | | | | | | |

Before applying the D.C. voltage between electrodes 1 and 3, its polarity was adjusted to that between the electrodes and its value was approximately adjusted to the voltage difference between the electrodes, so that its initial application to the electrodes produced negligible D.C. current. This precaution was taken to avoid large D.C. current which might otherwise have occurred momentarily if the D.C. voltage had been applied without previous adjustment, and which might have momentarily disturbed electrochemical behavoir of the measured corrosion interface. The D.C. voltage was then adjusted to produce the desired polarization voltage on electrode 1, and there was no requirement for measuring value of the applied D.C. voltage at the time of D.C. current measurement. This D.C voltage might instead have been adjusted to the polarity and value of voltage difference between electrodes 1 and 3 to be expected when these electrodes were polarized at the time of the D.C. current measurement. In making the second corrosion current measurement, direction of D.C. current passed between electrodes 1 and 3 was reversed by change in value of the applied D.C. voltage and without reversing its polarity.

The value of potential $E_f$ after current $i_{ma}$ measurement was found to rapidly attain its value before the measurement, and so $E_f$ was generally not measured again before current $i_{mc}$ was measured. The measured values of $i_{ma}$ and $i_{mc}$ were found to be independent of the sequence in which they were measured, and $i_{ma}$ was not always measured first.

The $i_d$-time curve was integrated to the quantity-time curve with anodic electrochemical reaction product taken as $Fe^{2+}$. Electronic conductors 1 and 3 were removed from the ionic conductor for weighing when the quantity-time curve measured 13.4 mg. of metal loss on electronic conductor 1.

Weighed metal loss on electronic conductor 1 was $15.0 \pm 0.5$ mg. The difference of $13.4-(15.0-0.5)=-1.1$ mg., amounting in percentage to $(100)(-1.1/15.5)=-7.8\%$, is slightly larger than the $+5\%$ precision expected from the measurement method. The completely deaerated environment favors adhesion of hydrogen bubbles to the metal surface, particularly at the high rate of hydrogen evolution produced by this corrosive, and suggests that these hydrogen bubbles in effect introduced a small IR voltage loss into the polarization voltage measurement by reducing the effective area of ionic conduction close to the corrosion interface.

*Example 3.—Measurement with a dissimilar and substantially unpolarized opposed interface*

This example illustrates measurement made with electronic conductor 1 forming the interface to be measured, with electronic conductor 3 being of composition other than that of electronic conductor 1, and with the area and corrodability of the opposed interface formed by electronic conductor 3 selected to substantially resist polarization by the measured value of D.C. current passed between conductors 1 and 3.

Measurements made with this electrode combination depend upon electrode 3 operating additionally as the reference electrode. The free electrode potential of electrode 1 is measured as the voltage difference between electronic conductors 1 and 3. The polarized electrode potential of electrode 1 is measured from the voltage difference between electronic conductors 1 and 3 at the time when the polarizing D.C. current passing between them is measured. The difference between these two cell voltages includes the polarization voltage of electrode 1, the IR voltage drop through the ionic conductor, and the substantially negligible polarization voltage of electrode 3. One purpose of this example is to illustrate the relative values of these three voltage drops with an ionic conductor solvent made of increasing conductivity and corrosivity by gradual additions of an electrolyte.

Electronic conductor 3 was taken in the form of a cast iron kettle having a hemispherical bottom of 24 cm. diameter. It was filled to a depth of 15 cm. along its major axis with 6 liters of distilled water. Electronic conductor 1 was a sheet of zinc ½ cm. wide and 2.5 cm. long, positioned along the major axis of the kettle, and immersed to a depth of 4 cm. below the liquid surface. A saturated calomel reference electrode with non-contaminating liquid junction was positioned ¼ inch from electrode 1, for purposes described below.

Each run of measurements summarized in Table 3 which follows, included an A series of measurements to measure the polarization voltage produced on electrode 1 and to measure the sum of the voltage loss of D.C. current conduction through the ionic conductor and any polarization voltage produced on electrode 3, and a B series of measurements applying the findings to corrosion current measurement with the electrode system of this example.

In the A series of measurements, the free electrode potentials $E_{f1}$ of electrode 1 and $E_{f3}$ of electrode 3 were measured from the calomel reference electrode at intervals of of time through a period required for these potentials to stabilize sufficiently for reasonable precision in subsequent measurements. The practically stabilized potential $E_{f1}$ is shown in Table 3 as "calomel $E_{f1}$." The free electrode potential of electrode 1 was then measured from electrode 3 and is shown in Table 3 as "cell $E_{f1}$." The potential $E_{f3}$ is not essential to the information summarized in Table 3, but can be calculated if desired from the relation, (calomel $E_{f1}$) − (cell $E_{f1}$) = calomel $E_{f3}$. An anodic polarization voltage $e_{a1}$ of 0.020 volt on electrode 1 was selected for these corrosion current measurements, from which the polarized electrode potential of electrode 1 was defined as $E_{f1}$ −0.020 volt as measured from the calomel reference electrode. A D.C. voltage was applied to the cell to polarize electrode 1 to this potential. This potential was maintained by adjustment of the applied D.C. voltage over a period of time required for rate of decrease of the polarizing D.C. current to diminish to the extent that substantially no change occurred over a time interval of about 30 seconds. The value of the polarizing D.C. current $i_m$, shown in Table 3, was then measured. The voltage value "Cell $E_{f1} - e_{a1} - IR - e_{c3}$"

in which $e_{c3}$ is the cathodic polarization voltage produced on electrode 3, was measured between electrode 1 and 3 and is shown in Table 3. The applied D.C. voltage was then removed from the cell. The current $i_m$ measures the corrosion current $i_a$ through the proportion, $$i_a/i_m = \tfrac{1}{2} E_d/0.020$$

The voltage "$e_{a1} + IR + e_{c3}$," shown in Table 3, was calculated through the subtraction (cell $E_{f1}$) − (cell $E_{f1} - e_{a1} - IR - e_{c3}$) = $e_{a1} + IR + e_{c3}$ The voltage "$IR + e_{c3}$," shown in Table 3, was calculated by subtracting the 0.020 volt polarization $e_{a1}$ of electrode 1 from "$e_{a1} + IR + e_{c3}$."

TABLE 3.—EVALUATION OF POTASSIUM CHLORIDE ADDITIONS TO DISTILLED WATER

| Run No. | Ionic conductor | Calomel $E_{f1}$ | Cell $E_{f1}$ | $i_m$ | Cell $E_{f1}-e_{a1}-IR-e_{c3}$ | $e_{a1}+IR+e_{c3}$ | $IR+e_{c3}$ | Method $i_m$ |
|---|---|---|---|---|---|---|---|---|
| 1-A<br>1-B | Distilled water, 6 liters. | 0.832 | 0.266<br>0.258 | 1.7 | 0.220<br>0.212 | 0.046<br>0.046 | 0.026<br>0.026 | 2.0 |
| 2-A<br>2-B | 0.180g. KCl | 0.866 | 0.259<br>0.252 | 7.0 | 0.218<br>0.218 | 0.041<br>0.034 | 0.021<br>0.014 | 7.0 |
| 3-A<br>3-B | 0.360 g. KCl | 0.908 | 0.264<br>0.270 | 9.8 | 0.236<br>0.242 | 0.028<br>0.028 | 0.008<br>0.008 | 9.4 |
| 4-A<br>4-B | 0.600 g. KCl | 0.943 | 0.286<br>0.282 | 10.5 | 0.263<br>0.259 | 0.023<br>0.023 | 0.003<br>0.004 | 10.4 |
| 5-A<br>5-B | 2.00 g. KCl | 0.978 | 0.310<br>0.307 | 15.0 | 0.292<br>0.287 | 0.018<br>0.020 | Zero<br>Zero | 14.0 |
| 6-A | 4.00 g. KCl | 0.994 | 0.324<br>0.320 | 20.8 | 0.302<br>0.300 | 0.022<br>0.020 | 0.002<br>Zero | 20.6 |
| A<br>B | Tap water, 6 liters. | 0.982 | 0.312<br>0.234 | 15.0 | 0.282<br>0.206 | 0.030<br>0.028 | 0.010<br>0.008 | 14.4 |

In the B series of measurements, the potential "cell $E_{f1}$" was again measured. The value, "cell $E_{f1} - e_{a1} - IR - e_{c3}$"

was calculated by subtracting the previously measured value of "$e_{a1} + IR + e_{c3}$" from the above measured "cell $E_{f1}$." The D.C. voltage was then applied to the cell to produce the voltage "cell $E_{f1} - e_{a1} - IR - e_{c3}$" between electrodes 1 and 3, and this voltage was maintained by adjustment of the applied D.C. voltage until the value of the polarizing D.C. current showed substantially no change over a time interval of about 30 seconds. The value of the polarizing D.C. current, "method $i_m$," shown in Table 3, was then measured. The applied D.C. voltage was then removed from the cell. The current, "method $i_m$," should theoretically agree with the current "$i_m$" measured in the A series, and the small differences shown in Table 3 are attributed mainly to slight drifting of the free electrode potentials of electrodes 1 and 3 which is unavoidable during initial short periods of corrosion, and which is regarded to not significantly interfere with the purposes of the measurements.

Table 3 summarizes additional measurements of the A and B series made after additions of increasing amounts of potassium chloride to the distilled water. Before each such salt addition the surface of electrode 1 was wiped with tissue paper to remove any insoluble corrosion products for the purpose of maintaining the electrode surface in an initial condition of corrosion rate, thereby to maintain precision of the measured relationship of $i_m$ to salt concentration.

Table 3 shows that the voltage "$IR + e_{c3}$" decreases to about 0.001 volt with 1.0 g. KCl in 6 liters of distilled water, which amounts to only $(1 \times 10^3)/6 = 167$ parts per million of salt. This indicates that with most corrosives encountered in industry, which have greater conductivity, the voltage "$IR + e_{c3}$" becomes negligible. There is little need for the current $i_m$ to be measured at values much greater than those shown in Table 3, since the area of electrode 1 can be adjusted to produce a current of value large enough to be measured with precision and small enough to avoid excessive IR voltage loss.

Additional perspective is given to the significance of the data of Table 3 by including these method measurements when made with 6 liters of tap water originating from Lake Michigan. It represents good quality of "make-up" water used in industry. The voltage "$IR + e_{c3}$" indicates that this water is similar to 0.4 g. KCl in 6 liters of distilled water, or 67 p.p.m. of KCl. The $i_m$ value of the tap water is slightly larger than the salt solution, probably because it contains some carbon dioxide.

The method of this invention may also be applied when $IR + e_{c3}$ is not negligible. For example, with an ionic conductor approximating the conductivity and corrosivity of this tap water, the voltage $(e_{a1} + IR + e_{c3})$, measured at the time of $i_m$ measurement may be selected from within the range of slightly above zero to about 0.03 volt, and the value of $e_{a1}$ then calculated from the above values measured on the tap water as, $e_{a1} = (e_{a1} + IR + e_{c3})(0.020/0.028)$, so that $i_a$ is measurable through the proportion, $i_a/i_m = \frac{1}{2} E_d / e_{a1}$. Alternatively, the selected and measured voltage $e_{a1} + IR + e_{c3}$ can be directly introduced into the proportionality measuring $i_a$, by adding a correcting voltage to the term, $\frac{1}{2} E_d$. This correcting voltage is calculated from the numeric values measured on the tap water as, $$\frac{(IR + e_{c3})(\frac{1}{2} E_d)}{(e_{a1})} = (.008/.020) \frac{1}{2} E_d$$

Corrosion current $i_a$ measurement is then made through the proportionality, $$i_a/i_m = (\frac{1}{2} E_d + 0.2 E_d)/(e_{a1} + IR + e_{c3})$$

When corrosion current $i_c$ is measured from cathodic polarization voltage $e_{c1}$ produced on electrode 1, the voltage between electrodes 1 and 3 measured at the times of measuring current $i_m$, becomes, cell $E_{f1} + e_{c1} + IR + e_{a3}$, so that the voltage, $e_{c1} + IR + e_{a1}$ is measured by subtracting voltage cell $E_{f1}$ measured before applying the D.C. voltage. The method of measuring $i_c$ then follows that for measuring $i_a$ described above, because it has been pointed out in earlier portions of this specification that a polarizing current $i_m$ produces $e_{a1} = e_{c1}$ in an unaccelerated corrosive, and because $e_{a3}$ and $e_{c3}$ are practically negligible compared to IR.

It was not possible to separately measure the voltages IR and $e_{c3}$ of this example by moving the calomel reference electrode from the center of the kettle to the side of the kettle. With no current passing between electrodes 1 and 3, a significant potential difference was found between these two reference electrode positions, attributed to localized corrosion current of kettle wall corrosion. The passage of D.C. current between electrodes 1 and 3 disturbed the distribution of these localized corrosion currents to the extent that IR measurement was possible. It can be deduced that polarization voltage $e_{c3}$ is negligible compared to voltage $e_{a1}$ in view of the data in Table 3, and this was substantiated by electrode potentials of the kettle made with the calomel electrode $\frac{1}{4}''$ from the kettle wall, in which no measurable polarization voltage was produced by current $i_m$.

Measurements made with electronic conductor 1 positioned $\frac{3}{4}$ inch from the kettle wall were in agreement with measurements made with electronic conductor 1 positioned through the major axis of the kettle. This is an agreement with theory.

ALTERNATIVES

The simplified method of this invention is found to produce accurate corrosion rate measurement through wide range of variation made in electronic conductor composition, ionic conductor composition, physical factors of corrosive environment, and duration of the corrosion, and confirms the characteristics of the interface electrode system described and measured in a preceding division of this invention, Serial No. 840,266, filed September 16, 1959. The possibility is nevertheless recognized that an exceptional corrosion interface might be encountered in practice, having characteristic voltage separation between consecutive transition points and characteristic line slope voltage differing from those defining the direct voltage in terms of $\frac{1}{2} E_d = 0.014 \pm 0.001$ volt as described in preceding portions of this specification. The method of this invention would remain applicable to such an exceptional corrosion interface through the value of the direct voltage defined from interface electrode system measurement by the method of the preceding division of this invention.

The method of this invention is described in the detail which includes the requirements for obtaining maximum accuracy of corrosion current measurement, but it is not restricted to high accuracy and may be applied to produce qualitative measurements. The method of this invention is regarded to be applied regardless of the accuracy with which it is operated.

I claim:

1. The method of measuring current in a corrosion cell indicative of corrosion current at the free electrode potential of an electrode including the steps of establishing within a non-gaseous ionic conductor a polarizable electrode to be measured and an opposed electrode of a material different from said polarizable electrode so that the opposed electrode is substantially unpolarizable in said ionic conductor during subsequent measurements, thereby forming interfaces of regular shape and contour, applying a direct current voltage selected to polarize the electrode to be measured within the range of slightly above zero to about $\frac{1}{2}$ (.04) volt to the electrodes, measuring the current passed through the interfaces when the current is substantially equal to the current value existing when substantially no change in current first occurs over a small time interval following application of voltage and before any visible change appears in the interfaces following application of said voltage, and measuring the voltage across said electrodes at the time of current measurement, whereby the current measured is proportional to the corrosion current by the proportion of the measured polarization voltage to a voltage within the range of ½ (0.29) to ½ (.035) volt.

2. The method of measuring current in a corrosion cell indicative of corrosion current at the free electrode potential of an electrode including the steps of establishing within a non-gaseous ionic conductor two electrodes of different material, thereby forming an electrode with an interface to be measured and a substantially non-polarizable reference electrode, applying a direct current voltage selected to polarize the electrode to be measured within the range of slightly above zero to about ½ (.04) volt to the two electrodes, measuring the current passed through the interface when the current is substantially equal to the current value existing when substantially no change in current first occurs over a small time interval following application of voltage and before any visible change appears in the measured interface following application of said voltage, and measuring the polarization voltage produced on the to be measured electrode with said reference electrode at the time of current measurement, whereby the current measured is proportional to the corrosion current by the proportion of the measured voltage to a voltage within the range of ½ (.029) to ½ (.035) volt.

3. The method of measuring current in a corrosion cell indicative of corrosion current at the free electrode potential of an electrode including the steps of establishing within a non-gaseous ionic conductor two electrodes of different materials, thereby forming one electrode with an interface to be measured and another electrode to pass current to said electrode to be measured, establishing a reference electrode within said cell, applying a direct current voltage selected to polarize the electrode to be measured within the range of slightly above zero to about ½ (.04) volt to the said two electrodes, measuring the current passed through the interface of said electrode to be measured when the current is substantially equal to the current value existing when substantially no change in current first occurs over a small time interval following application of voltage and before any visible change appears in the measured interface following application of said voltage, and measuring the polarization voltage produced on the electrode to be measured with said reference electrode at the time of current measurement, whereby the current measured is proportional to the corrosion current by the proportion of the measured voltage to a voltage within the range of ½ (.029) to ½ (.035) volt.

4. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, measuring the free electrode potential of the electronic-ionic conductor interface of said first named electrode at any instant of time selected for measurement during progress of the corrosion, thereafter applying a D.C. voltage to said first named electrode and said opposed electrode of value to polarize said interface to be measured by a voltage within the range from slightly above zero to about 0.02 volt, measuring the value of the polarizing D.C. current passed through said first named electrode and said opposed electrode and the value of the polarized electrode potential of said interface with the reference electrode when this current-potential relationship shows substantially no change over a small time interval, removing the applied D.C. voltage after completion of current and potential measurements, and relating the measured value of polarizing current to the value of the corrosion current by the ratio of the voltage difference between the measured value of polarized electrode potential and free electrode potential, divided by a voltage within the range of .013 to .021 volt.

5. The method of measuring current in a corrosion cell indicative of corrosion current at the free electrode potential of an electrode, including the steps of establishing within an ionic conductor a polarizable electrode forming an interface area of regular shape and contour for subsequent corrosion current measurement, establishing an opposed electrode within said ionic conductor, said opposed electrode being of regular shape and contour and of a material different from the material of said polarizable electrode so that the opposed electrode is substantially unpolarizable in said ionic conductor, establishing the unpolarizable electrode as a reference electrode separated from the polarizable electrode by small ionic conductor resistance, measuring the free electrode potential of said electronic-ionic conductor interface at any instant of time selected for measurement during progress of the corrosion, thereafter applying a D.C. voltage to the two electrodes of value to polarize said interface to be measured by a voltage within the range from slightly above zero to about 0.02 volt, measuring the value of the polarizing D.C. current passed between said electrodes and the value of the polarized electrode potential taken as the voltage across said electrodes when this current-potential relationship shows substantially no change over a small time interval, removing the applied D.C. voltage after completion of current and potential measurements, and relating the measured value of polarizing current to the value of the corrosion current by the ratio of the voltage difference between measured values of polarized electrode potential and free electrode potential, divided by a voltage within the range of .013 to .021 volt.

6. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing within said ionic conductor a reference electrode made of the same material as that from which the electrode to be measured is made, to measure the polarized electrode potential of the electronic-ionic conductor interface, whereby the free electrode potential of the interface to be measured remains substantially equal to the free electrode potential of the reference electrode, thereafter applying a D.C. voltage to said first named electrode and said opposed electrode of value to polarize said interface to be measured by a voltage within the range from slightly above zero to about .02 volt, measuring the value of the polarizing D.C. current passed through said first named electrode and said opposed electrode and the value of the polarization voltage of said interface with the reference electrode when this current-potential relationship shows substantially no change over a small time interval and before any visible change appears in the interface following application of said voltage, removing the applied D.C. voltage after completion of current and potential measurements, and relating the measured value of polarizing current to the value of the corrosion current by the ratio of the measured polarization voltage, divided by a voltage within the range of .013 to .022 volt.

7. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, thereafter applying a D.C. voltage to said first-named electrode and said opposed electrode of value to polarize said interface to be measured by a voltage within the range from slightly above zero to about 0.02 volt, measuring the value of the polarizing D.C. current passed through said first-named electrode and said opposed electrode and the value of the polarization voltage of said interface with the reference electrode when this current-potential relationship shows substantially no change over a small time interval, and relating the measured value of polarizing current to the value of the corrosion current by the ratio of the polarization voltage divided by a voltage within the range of .013 to .021 volt.

8. The method of measuring current in a corrosion cell indicative of corrosion current at the free electrode potential of an electrode including the steps of establishing within a non-gaseous ionic conductor a polarizable electrode to be measured and an opposed electrode of a material different from said polarizable electrode so that the opposed electrode is substantially unpolarizable in said ionic conductor during subsequent measurements, thereby forming interfaces of regular shape and contour, applying a direct current voltage selected to polarize the electrode to be measured within the range of slightly above zero to about ½ (.04) volt to the electrodes, measuring the current passed through the interfaces when the current is substantially equal to the current value existing when substantially no change in current first occurs over a small time interval following application of voltage and before any visible change appears in the interfaces following application of said voltage, measuring the voltage across said electrodes at the time of current measurement, whereby the current measured is proportional to the corrosion current by the proportion of the measured polarization voltage to a voltage within the range of ½ (.029) to ½ (.035) volt, and thereafter reversing the direction of current flow and again taking a current reading under the same conditions aforementioned thereby to obtain an average value of the corrosion current.

9. The method of measuring current in a corrosion cell indicative of corrosion current at the free electrode potential of an electrode including the steps of establishing within a non-gaseous ionic conductor two electrodes of different material, thereby forming an electrode with an interface to be measured and a substantially non-polarizable reference electrode, applying a direct current voltage selected to polarize the electrode to be measured within the range of slightly above zero to about ½ (.04) volt to the two electrodes, measuring the current passed through the interface when the current is substantially equal to the current value existing when substantially no change in current first occurs over a small time interval following application of voltage and before any visible change appears in the measured interface following application of said voltage, measuring the polarization voltage produced on the to be measured electrode with said reference electrode at the time of current measurement, whereby the current measured is proportional to the corrosion current by the proportion of the measured voltage to a voltage within the range of ½ (.029 to ½ (.035) volt, and thereafter reversing the direction of current flow and again taking a current reading under the same conditions aforementioned thereby to obtain an average value of the corrosion current.

10. The method of measuring current in a corrosion cell indicative of corrosion current at the free electrode potential of an electrode including the steps of establishing within a non-gaseous ionic conductor two electrodes of different materials, thereby forming one electrode with an interface to be measured and another electrode to pass current to said electrode to be measured, establishing a reference electrode within said cell, applying a direct current voltage selected to polarize the electrode to be measured within the range of slightly above zero to about ½ (.04) volt to the said two electrodes, measuring the current passed through the interface of said electrode to be measured when the current is substantially equal to the current value existing when substantially no change in current first occurs over a small time interval following application of voltage and before any visible change appears in the measured interface following application of said voltage, measuring the polarization voltage produced on the electrode to be measured with said reference electrode at the time of current measurement, whereby the current measured is proportional to the corrosion current by the proportion of the measured voltage to a voltage within the range of ½ (.029) to ½ (.035) volt, and thereafter reversing the direction of current flow and again taking a current reading under the same conditions aforementioned thereby to obtain an average value of the corrosion current.

11. The method of measuring current in a corrosion cell indicative of corrosion current at the free electrode potential of an electrode, including the steps of establishing within an ionic conductor and electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, measuring the free electrode potential of the electronic-ionic conductor interface of said first named electrode at any instant of time selected for measurement during progress of the corrosion, thereafter applying a D.C. voltage to said first named electrode and said opposed electrode of value to polarize said interface to be measured by a voltage within the range from slightly above zero to about 0.02 volt, measuring the value of the polarizing D.C. current passed through said first named electrode and said opposed electrode and the value of the polarized electrode potential of said interface with the reference electrode when this current-potential relationship shows substantially no change over a small time interval, thereafter reversing the direction of current flow and again taking a current reading under the same conditions aforementioned thereby to obtain an average value of the corrosion current, removing the applied D.C. voltage after completion of current and potential measurements, and relating the average measured value of polarizing current to the value of the corrosion current by the ratio of the voltage difference between the measured value of polarized electrode potential and free electrode potential, divided by a voltage within the range of .013 to .021 volt.

12. The method of measuring current in a corrosion cell indicative of corrosion current at the free electrode potential of an electrode, including the steps of establishing within the ionic conductor a polarizable electrode forming an interface area of regular shape and contour for subsequent corrosion current measurement, establishing an opposed electrode within said ionic conductor, said opposed electrode being of regular shape and contour and of a material different from the material of said polarizable electrode so that the opposed electrode is substantially unpolarizable in said ionic conductor, establishing the unpolarizable electrode as a reference electrode separated from the polarizable electrode by small ionic conductor resistance, measuring the free electrode potential of said electronic-ionic conductor interface at any instant of time selected for measurement during progress of the corrosion, thereafter applying a D.C. voltage to the two electrodes of value to polarize said interface to be measured by a voltage within the range from slightly above zero to about 0.02 volt, measuring the value of the polarizing D.C. current passed between said electrodes and the value of the polarized electrode potential taken as the voltage across said electrodes when this current-potential relationship shows substantially no change over a small time interval, thereafter reversing the direction of current flow and again taking a current reading under the same conditions aforementioned thereby to obtain an average value of the corrosion current, and relating the average measured value of polarizing current to the value of the corrosion current by the ratio of the voltage difference between measured values of polarized electrode potential and free electrode potential, divided by a voltage within the range of .013 to .021 volt.

13. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing within said ionic conductor a reference electrode made of the same material as that from which the electrode to be measured is made, to measure the polarized electrode potential of the electronic-ionic conductor interface, whereby the free electrode potential of the interface to be measured remains substantially equal to the free electrode potential of the reference electrode, thereafter applying a D.C. voltage to said first named electrode and said opposed electrode of value to polarize said interface to be measured by a voltage within the range from slightly above zero to about .02 volt, measuring the value of the polarizing D.C. current passed through said first named electrode and said opposed electrode and the value of the polarization voltage of said interface with the reference electrode when this current-potential relationship shows substantially no change over a small time interval and before any visible change appears in the interface following application of said voltage, thereafter reversing the direction of current flow and again taking a current reading under the same conditions aforementioned thereby to obtain an average value of the corrosion current, and relating the average measured value of polarizing current to the value of the corrosion current by the ratio of the measured polarization voltage, divided by a voltage within the range of .013 to .022 volt.

14. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, thereafter applying a D.C. voltage to said first-named electrode and said opposed electrode of value to polarize said interface to be measured by a voltage within the range from slightly above zero to about 0.02 volt, measuring the value of the polarizing D.C. current passed through said first-named electrode and said opposed electrode and the value of the polarization voltage of said interface with the reference electrode when this current-potential relationship shows substantially no change over a small time interval, thereafter reversing the direction of current flow and again taking a current reading under the same condition aforementioned thereby to obtain an average value of the corrosion current, and relating the average measured value of polarizing current to the value of the corrosion current by the ratio of the polarization voltage divided by a voltage within the range of .013 to 0.21 volt.

15. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing within said ionic conductor a reference electrode made of the same material as that from which the electrode to be measured is made, to measure the polarized electrode potential of the electronic-ionic conductor interface, whereby the free electrode potential of the interface to be measured remains substantially equal to the free electrode potential of the reference electrode, thereafter applying a D.C. voltage to said first named electrode and said opposed electrode of values to polarize said interface to be measured by a voltage within the range from slightly above zero to about .02 volt, measuring the value of the polarizing D.C. current passed through said first named electrode and said opposed electrode and the value of the polarization voltage of said interface with the reference electrode when this current-potential relationship shows substantially no change over a small time interval and before any visible change appears in the interface following application of said voltage, and relating the measured value of polarizing current to the value of the corrosion current by the ratio of the measured polarization voltage, divided by a voltage within the range of .013 to .022 volt.

16. The method of measuring current in a corrosion cell indicative of corrosion current at the free electrode potential of an electrode including the steps of establishing within a non-gaseous ionic conductor a polarizable electrode to be measured and an opposed electrode of a material different from said polarizable electrode so that the opposed electrode is substantially unpolarizable in said ionic conductor during subsequently measurements, thereby forming interfaces of regular shape and contour, applying a direct current voltage selected to polarize the electrode to be measured within the range of slightly above zero to about ½ (.04) volt to the electrodes, measuring the current passed through the interfaces when the current is substantially equal to the current value existing when substantially no change in current first occurs over a small time interval following application of voltage and before any visible change appears in the interfaces following application of said voltage, measuring the voltage across said electrodes at the time of current measurement, whereby the current measured is proportional to the corrosion current by the proportion of the measured polarization voltage to a voltage within the range of ½ (.029) to ½ (.035) volt, and thereafter changing the applied direct current voltage to reverse the direction of current flow and again measuring the current passed through the interfaces and the voltage across said electrodes under the same conditions aforementioned, thereby to obtain measurement of the corrosion current from polarizing current passed through the interface in anodic and in cathodic directions.

17. The method of measuring current in a corrosion cell indicative of corrosion current at the free electrode potential of an electrode including the steps of establishing within a non-gaseous ionic conductor two electrodes of different material, thereby forming an electrode with an interface to be measured and a substantially non-polarizable reference electrode, applying a direct current voltage selected to polarize the electrode to be measured within the range of slightly above zero to about ½ (.04) volt to the two electrodes, measuring the current passed through the interface when the current is substantially equal to the current value existing when substantially no change in current first occurs over a small time interval following application of voltage and before any visible change appears in the measured interface following application of said voltage, measuring the polarization voltage produced on the to be measured electrode with said reference electrode at the time of current measurement, whereby the current measured is proportional to the corrosion current by the proportion of the measured voltage to a voltage within the range of ½ (.029) to ½ (.035) volt, and thereafter changing the applied direct current voltage to reverse the direction of current flow and again measuring the current passed through the interface and the polarization voltage produced on the to be measured electrode under the same conditions aforementioned, thereby to obtain measurement of the corrosion current from the polarizing current passed through the interface in anodic and in cathodic directions.

18. The method of measuring current in a corrosion cell indicative of corrosion current at the free electrode potential of an electrode including the steps of establishing within a non-gaseous ionic conductor two electrodes of different materials, thereby forming one electrode with an interface to be measured and another electrode to pass current to said electrode to be measured, establishing a reference electrode within said cell, applying a direct current voltage selected to polarize the electrode to be measured within the range of slightly above zero to about ½ (.04) volt to the said two electrodes, measuring the current passed through the interface of said electrode to be measured when the current is substantially equal to the current value existing when substantially no change in current first occurs over a small time interval following application of voltage and before any visible change appears in the measured interface following application of said voltage, measuring the polarization voltage produced on the electrode to be measured with said reference electrode at the time of current measurement, whereby the current measured is proportional to the corrosion current by the proportion of the measured voltage to a voltage within the range of ½ (.029) to ½ (.035) volt, and thereafter changing the applied direct current voltage to reverse the direction of current flow and again measuring the current passed through the interface and the polarization voltage produced on the electrode to be measured under the same conditions aforementioned, thereby to obtain measurement of the corrosion current from polarizing current passed through the interface in anodic and in cathodic directions.

19. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, measuring the free electrode potential of the electronic-ionic conductor interface of said first named electrode at any instant of time selected for measurement during progress of the corrosion, thereafter applying a D.C. voltage to said first named electrode and said opposed electrode of value to polarize said interface to be measured by a voltage within the range from slightly above zero to about 0.02 volt, measuring the value of the polarizing D.C. current passed through said first named electrode and said opposed electrode and the value of the polarized electrode potential of said interface with the reference electrode when this current-potential relationship shows substantially no change over a small time interval, thereafter changing the applied D.C. voltage to reverse the direction of current flow and again measuring the value of the polarizing D.C. current and the value of the polarized electrode potential under the same conditions aforementioned, removing the applied D.C. voltage after completion of current and potential measurements, thereby to obtain measurement of the corrosion current from polarizing current passed through the interface in anodic and in cathodic directions, whereby the corrosion current is related to the measured currents by a proportionality factor.

20. The method of measuring current in a corrosion cell indicative of corrosion current at the free electrode potential of an electrode, including the steps of establishing within the ionic conductor a polarizable electrode forming an interface area of regular shape and contour for subsequent corrosion current measurement, establishing an opposed electrode within said ionic conductor, said opposed electrode being of regular shape and contour and of a material different from the material of said polarizable electrode so that the opposed electrode is substantially unpolarizable in said ionic conductor, establishing the unpolarizable electrode as a reference electrode separated from the polarizable electrode by small ionic conductor resistance, measuring the free electrode potential of said electronic-ionic conductor interface at any instant of time selected for measurement during progress of the corrosion, thereafter applying a D.C. voltage to the two electrodes of value to polarize said interface to be measured by a voltage within the range from slightly above zero to about 0.02 volt, measuring the value of the polarizing D.C. current passed between said electrodes and the value of the polarized electrode potential taken as the voltage across said electrodes when this current-potential relationship shows substantially no change over a small time interval, thereafter changing the applied D.C. voltage to reverse the direction of current flow and again measuring the value of the polarizing D.C. current and the value of the polarized electrode potential under the same conditions aforementioned, thereby to obtain measurement of the corrosion current from polarizing current passed through the interface in anodic and in cathodic directions, whereby the corrosion current is related to the measured currents by a proportionality factor.

21. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing within said ionic conductor a reference electrode made of the same material as that from which the electrode to be measured is made, to measure the polarized electrode potential of the electronic-ionic conductor interface, whereby the free electrode potential of the interface to be measured remains substantially equal to the free electrode potential of the reference electrode, therafter applying a D.C. voltage to said first named electrode and said opposed electrode of value to polarize said interface to be measured by a voltage within the range from slightly above zero to about .02 volt, measuring the value of the polarizing D.C. current passed through said first named electrode and said opposed electrode and the value of the polarization voltage of said interface with the reference electrode when this current-potential relationship shows substantially no change over a small time interval and before any visible change appears in the interface following application of said voltage, thereafter changing the applied D.C. voltage to reverse the direction of current flow and again making a current measurement and polarization voltage measurements under the same conditions aforementioned and in each of the two sets of measurements relating the measured value of polarizing current to the value of the corrosion current by the ratio of the measured polarization voltage, divided by a voltage within the range of .013 to .022 volt, thereby obtaining measurement of the corrosion current from the polarizing current in anodic and cathodic directions.

22. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, thereafter applying a D.C. voltage to said first-named electrode and said opposed electrode of value to polarize said interface to be measured by a voltage within the range from slightly above zero to about 0.02 volt, measuring the value of the polarizing D.C. current passed through said first-named electrode and said opposed electrode and the value of the polarization voltage of said interface with the reference electrode when this current-potential relationship shows substantially no change over a small time interval, thereafter changing the applied D.C. voltage to reverse the direction of current flow and again measuring the value of the polarizing D.C. current and the value of the polarization voltage under the same conditions aforementioned, thereby to obtain measurement of the corrosion current from polarizing current passed through the interface in anodic and in cathodic directions, whereby the corrosion current is related to the measured currents by a proportionality factor.

23. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing within said ionic conductor a reference electrode made of the same material as that from which the electrode to be measured is made, to measure the polarized electrode potential of the electronic-ionic conductor interface, whereby the free electrode potential of the interface to be measured remains substantially equal to the free electrode potential of the reference electrode, thereafter applying a D.C. voltage to said first named electrode and said opposed electrode of value to polarize said interface to be measured by a voltage within the range from slightly above zero to about .02 volt, measuring the value of the polarizing D.C. current passed through said first named electrode and said opposed electrode and the value of the polarization voltage of said interface with the reference electrode when this current-potential relationship shows substantially no change over a small time interval and before any visible change appears in the interface following application of said voltage, whereby the measured value of polarizing current is related to the value of the corrosion current by the ratio of the measured polarization voltage, divided by a voltage within the range of .013 to .022 volt.

24. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing within said ionic conductor a reference electrode made of the same material as that from which the electrode to be measured is made, to measure the polarized electrode potential of the electrode-ionic conductor interface, whereby the free electrode potential of the interface to be measured remains substantially equal to the free electrode potential of the reference electrode, thereafter applying a D.C. voltage to said first named electrode and said opposed electrode of value to polarize said interface to be measured by a voltage within the range from slightly above zero to about .02 volt, and measuring the value of the polarizing D.C. current passed through said first named electrode and said opposed electrode and the value of the polarization voltage of said interface with the reference electrode when this current-potential relationship shows substantially no change over a small time interval and before any visible change appears in the interface following application of said voltage, whereby the measured value of polarizing current is related to the corrosion current by a proportionality factor.

25. The method of measuring current in a corrosion cell indicative of corrosion current at the free electrode potential of an electrode, including the steps of establishing within an ionic conductor an electrode forming an interface area of regular shape and contour for subsequent corrosion current measurement, establishing an opposed electrode in ionic conductor conduction with the ionic conductor to subsequently pass D.C. current between the two electrodes, establishing a reference electrode to measure potentials of the electronic-ionic conductor interface, thereafter applying a D.C. voltage to said first-named electrode and said opposed electrode of value to polarize said interface to be measured by a voltage within the range from slightly above zero to about 0.02 volt, measuring the value of the polarizing D.C. current passed through said first-named electrode and said opposed electrode and the value of the polarization voltage of said interface with the reference electrode when this current-potential relationship shows substantially no change over a small time interval, whereby the measured value of the polarizing current is related to the natural occurring corrosion current by a proportionality factor.

26. The method of measuring current in a corrosion cell indicative of corrosion current at the free electrode potential of an electrode including the steps of establishing within a non-gaseous ionic conductor a polarizable electrode to be measured and an opposed electrode of a material different from said polarizable electrode so that the opposed electrode is substantially unpolarizable in said ionic conductor during subsequent measurements, thereby forming interfaces of regular shape and contour, applying a direct current voltage selected to polarize the electrode to be measured within the range of slightly above zero to about ½ (.04) volt to the electrodes, measuring the current passed through the interfaces when the current is substantially equal to the current value existing when substantially no change in current first occurs over a small time interval following application of voltage and before any visible change appears in the interfaces following application of said voltage, and measuring the voltage across said electrodes at the time of current measurement, whereby the measured value of polarizing current is related to the natural occurring corrosion current by a proportionality factor.

References Cited by the Examiner
UNITED STATES PATENTS
3,069,332   12/1962   Seyl _____ 204—1

References Cited by the Applicant
UNITED STATES PATENTS
1,891,004   12/1932   Neeley.
2,071,697   2/1937    Larrabee.
2,221,997   11/1940   Polin.
2,370,871   3/1945    Marks.
2,374,088   4/1945    Fontana et al.

OTHER REFERENCES

A. C. Makrides: Corrosion 18, 338+ (1962).

An Investigation of the Utility of Instantaneous Corrosion Rate Measurements for Inhibitor Studies, by Rob- (Other references on following page)

OTHER REFERENCES ert R. Annand, presented at the 21st Annual Conference of the NACE, St. Louis, Mo., March 19, 1965.

E. J. Simmons: Corrosion 11, 255+ (1955).

Evans: Metallic Corrosion Passivity and Protection, Edward Arnold and Co., London, 1946, p. 19–22.

G. A. Marsh and E. Schoschl: Paper presented to 29th Mid-Year Meeting API/Div. Refining, St. Louis, May (1964).

G. A. Marsh: Paper presented at the 2nd International Congress on Metallic Corrosion, New York, March 1963.

Handbook of Chemistry and Physics, pp. A–112 and A–113, The Chemical Rubber Co., Cleveland, Ohio, 1964.

J. M. Kilpatrick: Oil and Gas Journal 62, No. 11, 155 (1964).

M. Stern and A. C. Makrides: Journal Electrochem, Soc. 107, 782 (1960).

M. Stern and A. L. Geary: Journal Electrochem. Soc. 104, 56 (1957).

M. Stern: Corrosion 14, 440+ (1958).

M. Stern and E. D. Weisert: Proc. A.S.T.M. 59, 1280 (1959).

R. G. Seyl: U.S. Pats. 3,069,332, and 3,156,631.

R. U. Skold and T. E. Larson: Corrosion 13, 139+ (1957).

R. A. Legault and M. S. Walker, Corrosion 19, 222+ (1963).

Trans. of the Electrochemical Soc., vol. 67, The Electrochemical Soc. Inc., N.Y., 1935, pp. 357–363.

W. E. Seffens: Tretolite Division Laboratory, Petrolite Corp., St. Louis, Mo., Private Communication.

W. J. Youden: Statistical Methods for Chemists, pp. 20–23, John Wiley & Sons, Inc. (1951).

JOHN H. MACK, *Primary Examiner.*

T. TUNG, *Examiner.*